US012575000B2

(12) United States Patent
Tan et al.

(10) Patent No.: US 12,575,000 B2
(45) Date of Patent: Mar. 10, 2026

(54) METHOD AND APPARATUS FOR SURVIVAL TIME UTILIZATION

(71) Applicant: ZTE Corporation, Shenzhen (CN)

(72) Inventors: Jie Tan, Shenzhen (CN); Xiubin Sha, Shenzhen (CN); Bo Dai, Shenzhen (CN); Ting Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 334 days.

(21) Appl. No.: 18/240,667

(22) Filed: Aug. 31, 2023

(65) Prior Publication Data

US 2024/0098842 A1     Mar. 21, 2024

Related U.S. Application Data

(63) Continuation of application No. PCT/CN2021/084823, filed on Apr. 1, 2021.

(51) Int. Cl.
| | |
|---|---|
| *H04W 76/38* | (2018.01) |
| *H04W 72/11* | (2023.01) |
| *H04W 72/232* | (2023.01) |
| *H04W 76/20* | (2018.01) |

(52) U.S. Cl.
CPC ........... *H04W 76/38* (2018.02); *H04W 72/11* (2023.01); *H04W 72/232* (2023.01); *H04W 76/20* (2018.02)

(58) Field of Classification Search
CPC ..... H04W 76/38; H04W 76/20; H04W 72/11; H04W 72/232
See application file for complete search history.

(56) References Cited

U.S. PATENT DOCUMENTS

| | | | |
|---|---|---|---|
| 2019/0215730 A1* | 7/2019 | Qiao | H04L 43/087 |
| 2020/0236579 A1* | 7/2020 | Cho | H04W 24/10 |
| 2020/0267088 A1 | 8/2020 | Navártil et al. | |
| 2021/0235399 A1* | 7/2021 | Wich | H04W 28/0268 |
| 2021/0337404 A1* | 10/2021 | Sun | H04W 72/23 |
| 2022/0124764 A1* | 4/2022 | Zhao | H04L 1/1851 |
| 2023/0261801 A1* | 8/2023 | Fu | H04W 28/0268 |
| | | | 370/329 |
| 2023/0292173 A1* | 9/2023 | Zou | H04W 28/06 |
| 2023/0362707 A1* | 11/2023 | Fu | H04L 47/283 |
| 2023/0421312 A1* | 12/2023 | Fu | H04L 5/0092 |
| 2024/0298335 A1* | 9/2024 | Löhr | H04L 1/0061 |

FOREIGN PATENT DOCUMENTS

WO      WO 2019/095381 A1      5/2019

OTHER PUBLICATIONS

Extended European Search Report dated Jan. 23, 2025 issued in European Application No. 21933927.2, 29 pages.
Partial Supplementary European Search Report, Oct. 11, 2024, pp. 1-37, issued in European Application No. 21933927.2, European Patent Office, The Hague, The Netherlands.

(Continued)

*Primary Examiner* — Jael M Ulysse
(74) *Attorney, Agent, or Firm* — Crowell & Moring LLP

(57) ABSTRACT

Service-related parameters may be communicated for a survival time measurement. Those parameters can be wirelessly communicated on the Radio Access Network ("RAN") side. A measurement of the survival time and implementation of a survival time timer is based on those parameters and/or a timer for a packet delay budget.

12 Claims, 14 Drawing Sheets

(56) References Cited

OTHER PUBLICATIONS

Ericsson, RAN enhancements based on new QoS related parameters, Nov. 2-13, 2020, pp. 1-9, 3GPP TSG-RAN WG2 #112-e, TDoc R2-2008882, Electronic.

Nokia, Nokia Shanghai Bell, Offline on RAN enhancements QoS [AT113-e] [506] Jan. 25-Feb. 5, 2021, pp. 1-29. 3GPP TSG-RAN WG2 Meeting #113 Electronic, R2-2102074, Elbonia.

OPPO, Consideration on RAN enhancement based on new QoS, Jan. 2021, pp. 1-4, 3GPP TSG-RAN WG2 #113-e, R2-2102229, E-Meeting.

International Search Report and Written Opinion received for Application No. PCT/CN2021/084823 mailed Jan. 4, 2022 (8 pages).

Intel Corporation, "R2-2100614 Support for Survival Time and Burst Spread," *3GPP TSG RAN W62 Meeting #113e*, Feb. 5, 2021 (6 pp.).

ZTE et al. "R2-2100328 Further considerations on new QoS," *3GPP TSG-RAN WG2 Meeting #113 E-meeting*, Feb. 5, 2021 (7 pp.).

* cited by examiner

Figure 1

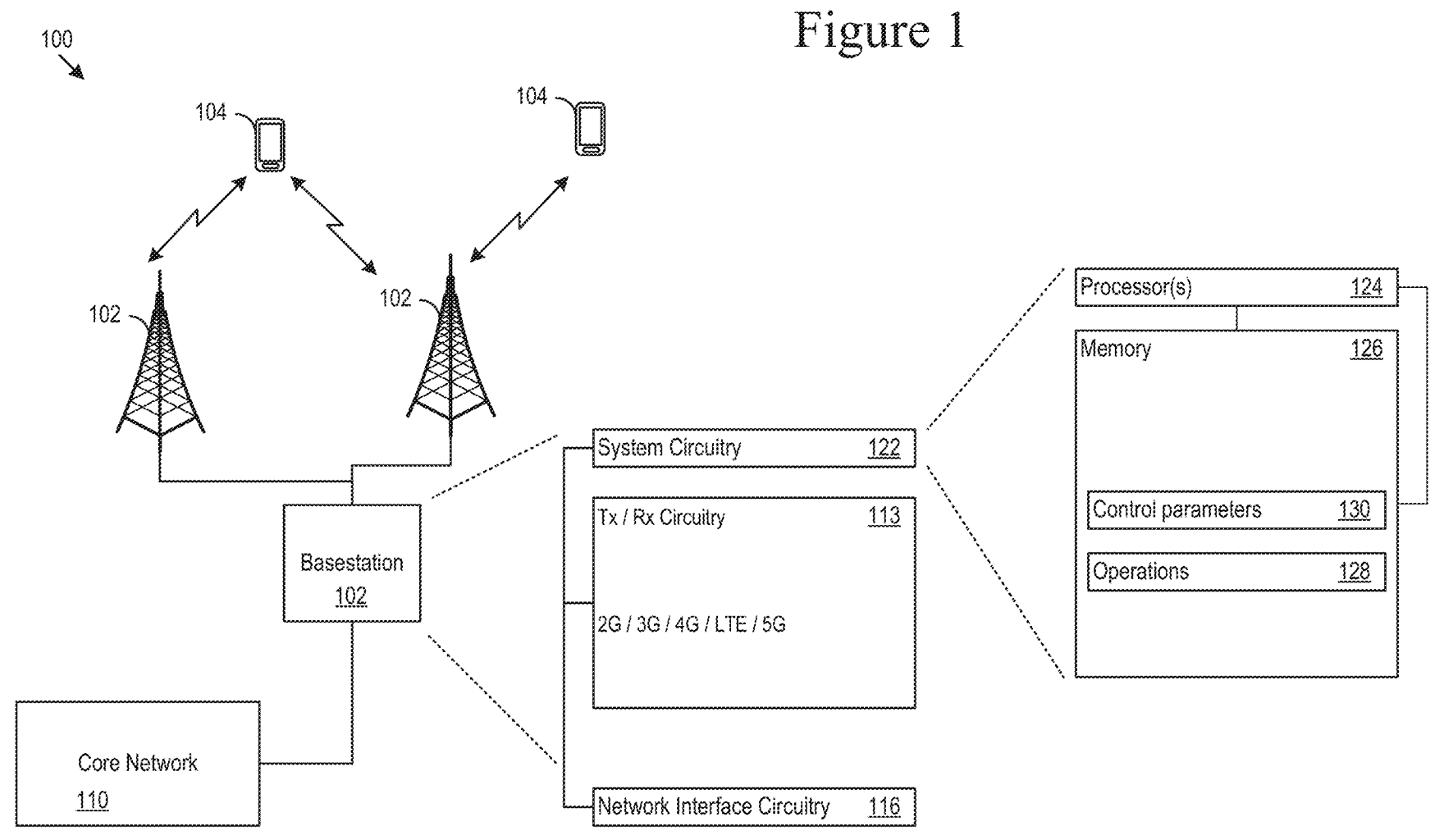

Processor(s) 124

Memory 126

Control parameters 130

Operations 128

System Circuitry 122

Tx / Rx Circuitry 113

2G / 3G / 4G / LTE / 5G

Network Interface Circuitry 116

104

102

104

102

Basestation 102

Core Network 110

100

METHOD AND APPARATUS FOR SURVIVAL TIME UTILIZATION

PRIORITY

This application claims priority as a Continuation to PCT/CN2021/084823, filed on Apr. 1, 2021, published as WO 2022/205267 A1, entitled "METHOD AND APPARATUS FOR SURVIVAL TIME UTILIZATION", the entire disclosure of which is herein incorporated by reference.

TECHNICAL FIELD

This document is directed generally to wireless communications. More specifically, a survival time timer is utilized.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. In order to improve communications and meet reliability requirements for the vertical industry as well as support the new generation network service, communication improvements should be made.

SUMMARY

This document relates to methods, systems, and devices for communicating service-related parameters for a survival time measurement. Those parameters can be wirelessly communicated on the Radio Access Network ("RAN") side. A measurement of the survival time and implementation of a survival time timer is based on those parameters and/or a timer for a packet delay budget.

In one embodiment, a method for wireless communication includes starting an access network packet delay budget ("AN PDB") timer and starting a survival time timer based on the AN PDB timer. The method may include determining, with a feedback mechanism, whether the packet was successfully sent and resetting the AN PDB timer when the packet was successfully sent. The starting of the AN PDB timer may be based on an arrival time of the packet. The starting of the AN PDB timer may be based on a configured grant ("CG") time or a semi-persistent scheduling ("SPS"). When there are multiple AN PDB timers in a cycle, the starting of the survival time timer may be based on a last AN PDB timer in a cycle. When the survival time timer is not started, the survival time timer is started after the AN PDB timer expires. When survival time timer is not started, when the packet is not received or when the packet is an empty packet, the survival time timer is not started. The AN PDB timer may be reset when the AN PDB timer expires.

In one embodiment, a method for wireless communication includes starting an access network packet delay budget ("AN PDB") timer and starting a survival time timer based on the AN PDB timer. The method may include determining a packet in a subsequent cycle was successfully transmitted and resetting the survival time timer when the packet was successfully transmitted in the subsequent cycle. The feedback mechanism comprises at least one of a dedicated DCI including ACK, no retransmission schedule received for a period of time, or a new packet schedule received within a specific period of time. The method includes determining, by anticipating reception of a packet, whether the packet is received and whether the packet is an empty packet, and starting the AN PDB timer when the packet is not received or when the packet is an empty packet. The starting of the survival time timer is based on receipt of the empty packet. The survival time timer may be restarted after the survival time timer has been started and the AN PDB timer, which is triggered by an empty packet, expires. When the survival time timer is started, when the packet is not received or when the packet is an empty packet, the survival time timer is stopped and the stopped survival time timer is continued after the empty packet cycle. When the survival time timer is started, when the packet is not received or when the packet is an empty packet, the survival time timer is restarted after the empty packet cycle. The wireless communication is downlink when the sender is a basestation and the receiver is user equipment. The wireless communication is uplink when the receiver is a basestation and the sender is user equipment. The method includes receiving a message including service related parameters from Access and Mobility Management Function ("AMF") or basestation. The service related parameters comprise at least one of a Periodicity, a Burst Arrival Time, a survival time, a threshold for the survival time timer, or a feedback mechanism related parameter. The method includes triggering a report when the survival time timer expires or when the survival time timer exceeds the survival time timer threshold, activating a duplication function when the survival time timer expires or when the survival time timer exceeds the survival time timer threshold, or requesting, by user equipment ("UE"), to switch a logical channel when the survival time timer expires or when the survival time timer exceeds the survival time timer threshold.

In one embodiment, a method for wireless communication includes a basestation that provides service related parameters to a user equipment ("UE") device by a radio resource control ("RRC") message. The RRC message may include at least one of the following: RRCReestablishment, RRCReconfiguration, RRCResume, RRCReject, RRCSetup. The service related parameters may comprise at least one of a Survival Time, a Survival Time threshold, a Periodicity a Burst Arrival Time, or a feedback mechanism related parameter.

In one embodiment, a method for wireless communication includes an Access and Mobility Management Function ("AMF") that provides service related parameters to a user equipment ("UE") device by non-access stratum ("NAS") signalling. The service related parameters may comprise at least one of a Survival Time, a Periodicity, a Burst Arrival Time, or a feedback mechanism related parameter.

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

BRIEF DESCRIPTION OF THE DRAWINGS

FIG. 1 shows an example basestation.

DETAILED DESCRIPTION

Figure 2:
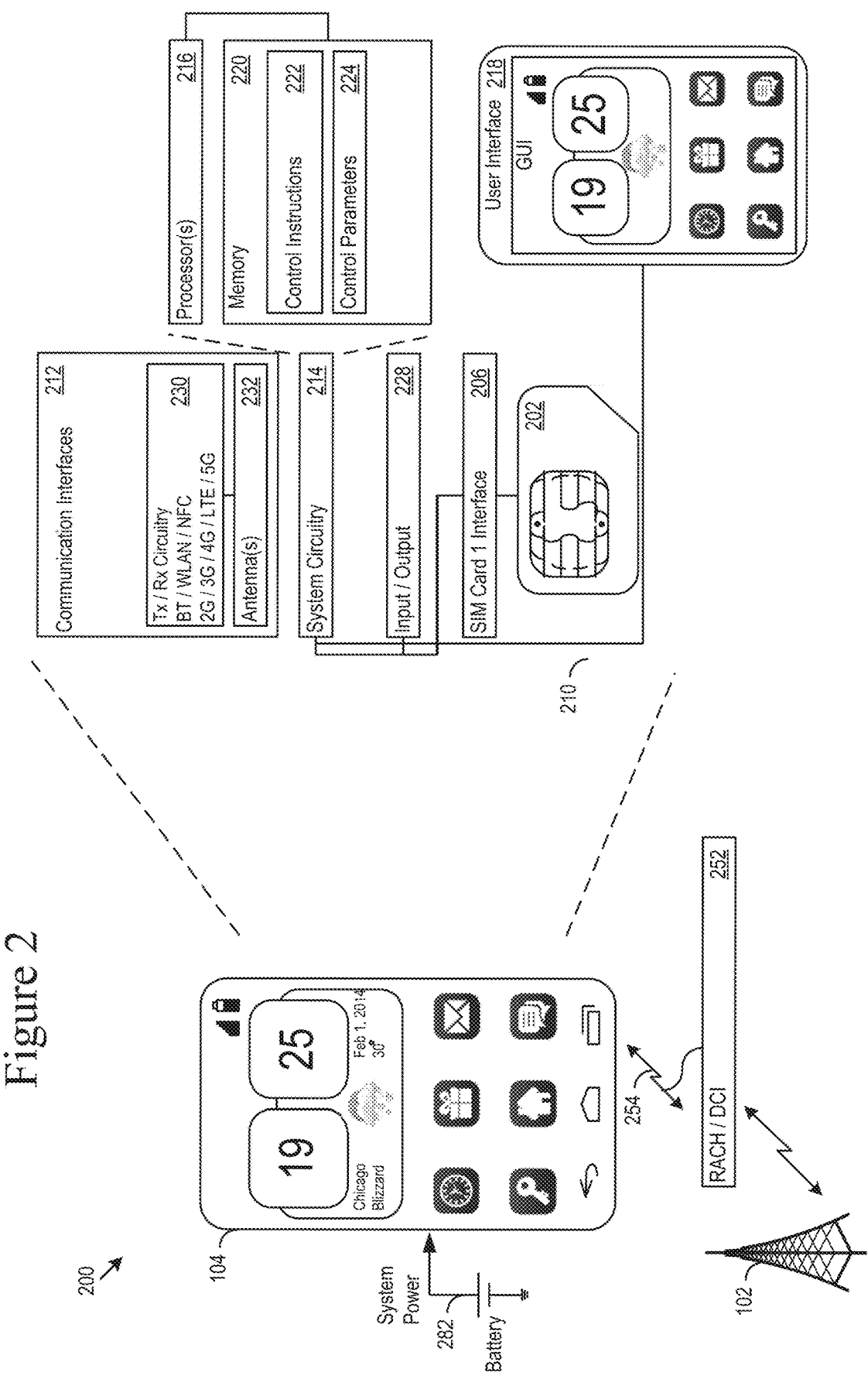
FIG. 2 shows an example random access (RA) messaging environment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

New Radio Access ("NR") includes the parameter survival time in the application layer to relax the quality of service ("QoS") requirements for reliability. The survival time may be transferred as part of the TSC Assistance Information ("TSCAI") parameter. The TSCAI may not always include the survival time. The Session Management Function ("SMF") determines survival time and sends it to the Next Generation Radio Access Network ("NG RAN") as part of TSCAI without requiring a specific signalling exchange with the user equipment ("UE") device. The RAN may be a part of a wireless communication system that connects UE devices to other parts of a network through radio or wireless connections.

The survival time may include the time that an application consuming a communication service may continue without an anticipated message. The survival time information may further include the maximum number of consecutive message transmission failures. The SMF translates the maximum number of consecutive message transmission failures to a time unit based on a TSCAI periodicity parameter and determines survival time.

As described below, the survival time and or parameters related to service may be referred to as service related parameters or information. The methods, systems, and devices described herein communicate those parameters wirelessly on the Radio Access Network ("RAN") side and utilize them for survival time measurements. A threshold of survival time can be used for triggering Packet Data Convergence Protocol ("PDCP") duplication. The parameters can be provided by an Access and Mobility Management Function ("AMF") to a user equipment ("UE") device by a radio resource control ("RRC") message or provided by a basestation by non-access stratum ("NAS") signalling.

The operation of the survival time timer may be based on a monitoring timer as discussed below, e.g. the monitoring timer may be an Access Network Packet Delay Budget ("AN PDB") timer. A PDB may be an upper bound for an amount of time that a packet can be delayed. In one example, PDB may be a delay between the UE and other network points. As discussed below in FIGS. 9-10, the PDB may be the same in uplink ("UL") and downlink ("DL") communications. PDB may be used to support a configuration of scheduling and link layer functions. The AN PDB is determined by subtracting the Core Network PDB ("CN PDB") from the PDB. In other words, AN PDB=PDB−CN PDB. In one embodiment, the CN PDB may be a static value that is preconfigured or specified in the quality of service ("QoS") characteristics.

Radio resource control ("RRC") is a protocol layer between UE and the basestation at the IP level (Network Layer). RRC messages are transported via the Packet Data Convergence Protocol ("PDCP"). As described, UE can transmit infrequent (periodic and/or non-periodic) data in RRC_INACTIVE state without moving to an RRC_CONNECTED state. This can save the UE power consumption and signaling overhead. This can be through a Random Access Channel ("RACH") protocol scheme or a Configured Grant ("CG") scheme. CG may be used to reduce the waste of periodically allocated resources by enabling multiple devices to share periodic resources. The basestation may assign CG resources to eliminate packet transmission delay and to increase a utilization ratio of allocated periodic radio resources. The CG scheme is merely one example of a protocol scheme for communications and other examples, including but not limited to RACH, are possible.

FIG. 1 shows an example basestation 102. The basestation may also be referred to as a wireless network node. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

A duplication function may include packet duplication that ensures that packets are not missed and reliability is improved. Packet Data Convergence Protocol ("PDCP") duplication is one example of a duplication function. The PDCP layer handles transfer of user data, header compression, sequence numbering, duplication detection, packet duplication, etc. PDCP duplication may be supported for both user and control planes. The PDCP layer in the transmitter may be responsible for packet duplication while the PDCP layer in the receiver can detect duplicate packets. Duplicated packets have the same PDCP sequence number, which can be used for identification.

Figure 3:
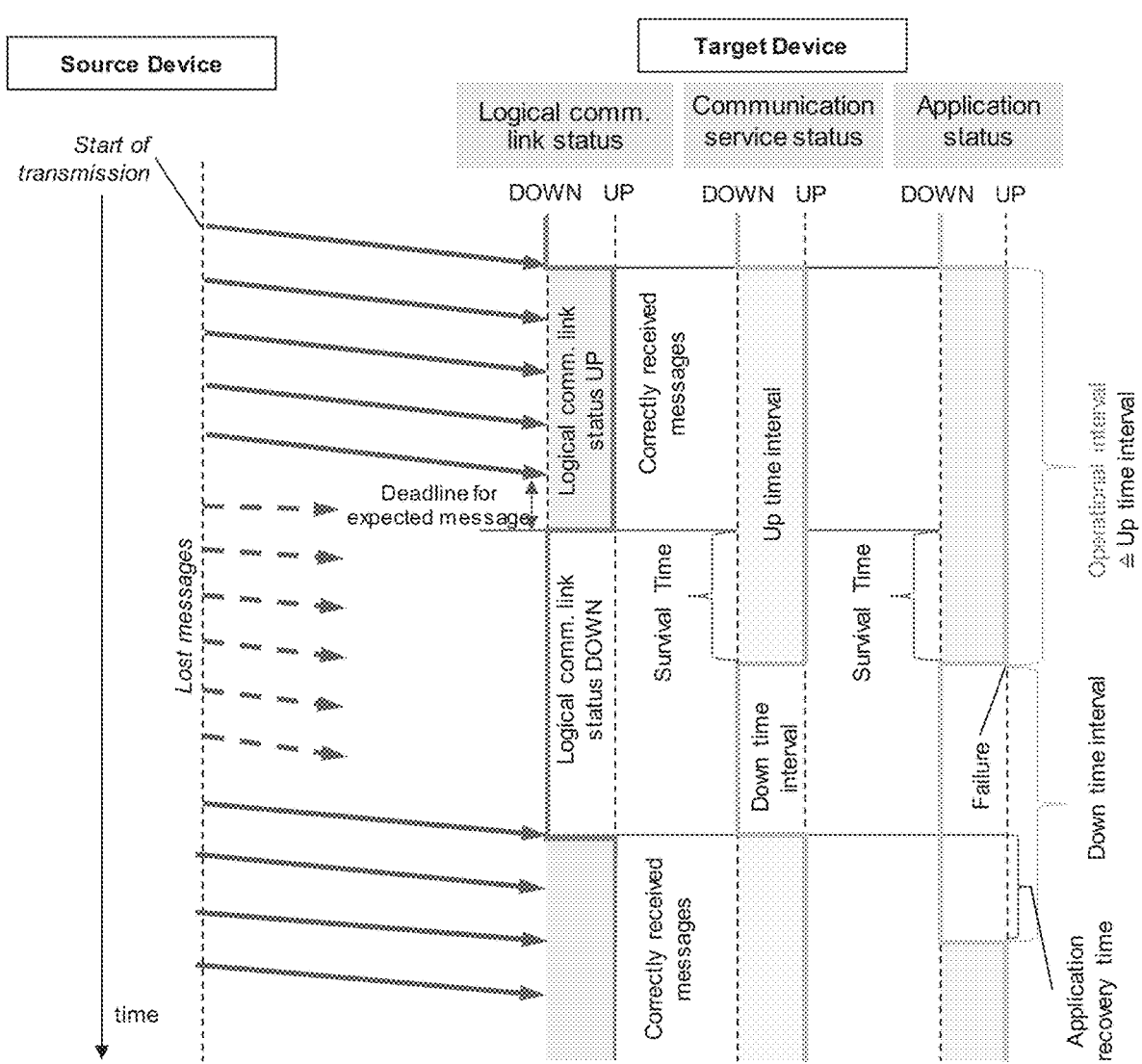
FIG. 3 shows one embodiment of relationships between communication links, communication service statuses, and application statuses.

FIG. 3 shows one embodiment of relationships between communication links, communication service statuses, and application statuses. The passage of time is shown along the y-axis with the start of the transmission from the source device to the target device. There are lost messages as part of the transmission, so the timeliness or correctness fails. FIG. 3 illustrates the logical communication link status, the communication service status, and the application status for the target device for receiving the transmission. Upon the lost messages, the survival time is illustrates for the communication service status, which are listed as up during the survival time, but upon expiration of the survival time timer (without receiving a message), the communication service status is down. Likewise, the survival time timer is shown for the application status where a failure is recognized after the survival time timer expires.

The survival time is the time that an application consuming a communication service may continue without an anticipated message. Anticipation of a message may imply both timeliness and correctness for the message, which may be part of three conditions: 1) the message needs to arrive in time (timeliness); 2) only uncorrupted messages are accepted by the receiver; and 3) the received messages need to be processed and sent out. If at least one of these conditions is not fulfilled, a survival time timer is started by the automation function. Upon expiration of the timer, the communication service for that application is declared unavailable.

Figure 4:
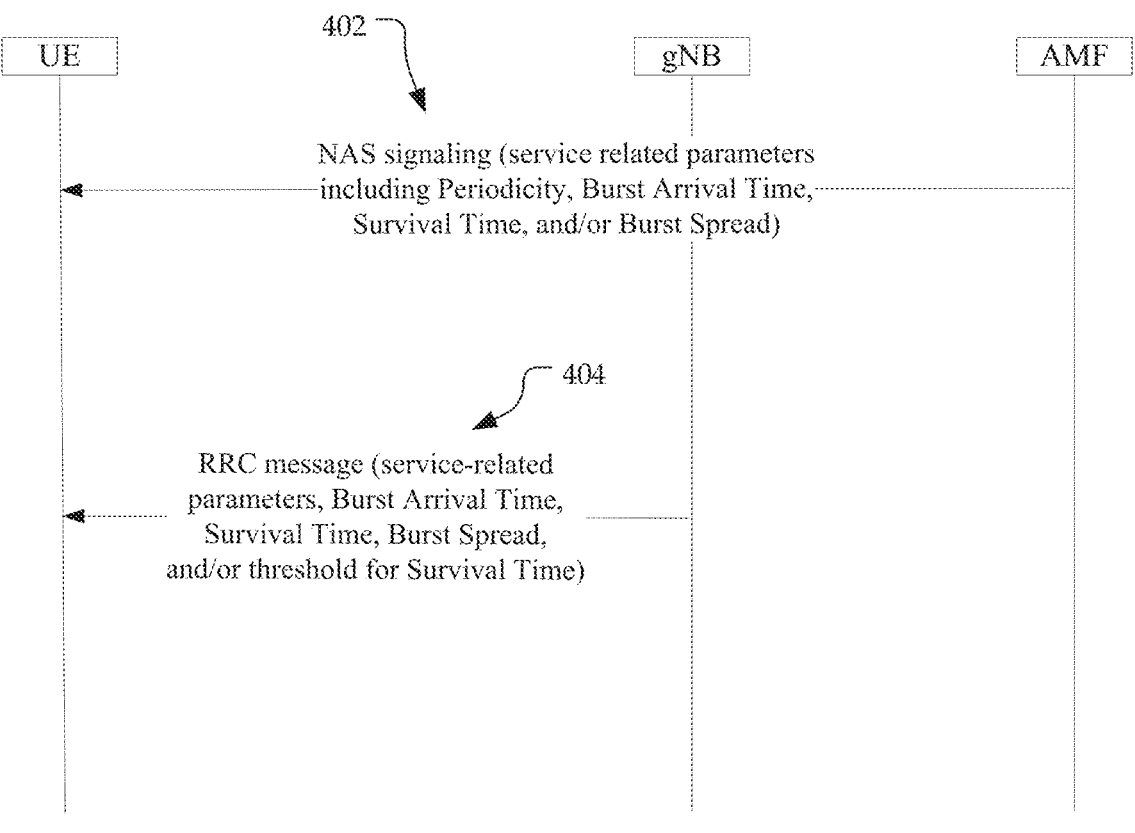
FIG. 4 shows one embodiment for communication with service-related parameters.

FIG. 4 shows embodiments for communication with service-related parameters. In the uplink packet transmission, the UE needs to know the parameters related to the service. Those parameters in communication 402 are called the service-related parameters and may include Periodicity, Burst Arrival Time, Survival Time, feedback mechanism related parameter(s) and a threshold for Survival Time in one embodiment. The feedback mechanism related parameter(s) may be values defined by the high level over a period of time. This period of time is used by the sender to determine whether some scheduling indications have been received. In other embodiments, there may be more or fewer service-related parameters. The AMF may the non-access stratum NAS signalling to send the service-related parameters to the UE. The signal may include a packet data unit ("PDU") that may include: PDU SESSION RESOURCE SETUP REQUEST, PDU SESSION RESOURCE RELEASE COMMAND, PDU SESSION RESOURCE MODIFY REQUEST, INITIAL CONTEXT SETUP REQUEST, HANDOVER REQUEST, INITIAL UE MESSAGE, and/or DOWNLINK NAS TRANSPORT for the communication 402. In one embodiment, the service-related parameters are communicated in communication 404 from the basestation ("gNB") to the UE. The basestation may use RRC messaging to send the service-related parameters to the UE. The RRC message may include at least one of the following: RRCReestablishment, RRCReconfiguration, RRCResume, RRCReject, RRCSetup.

The service-related parameters that are communicated may be used for setting the timers. The timers may include the survival time and the AN PDB. The communications in FIGS. 4a-4b may be made according to measurement results shown below. Specifically, FIGS. 5-9 and FIGS. 11-14 show example measurement cases.

Figure 5:
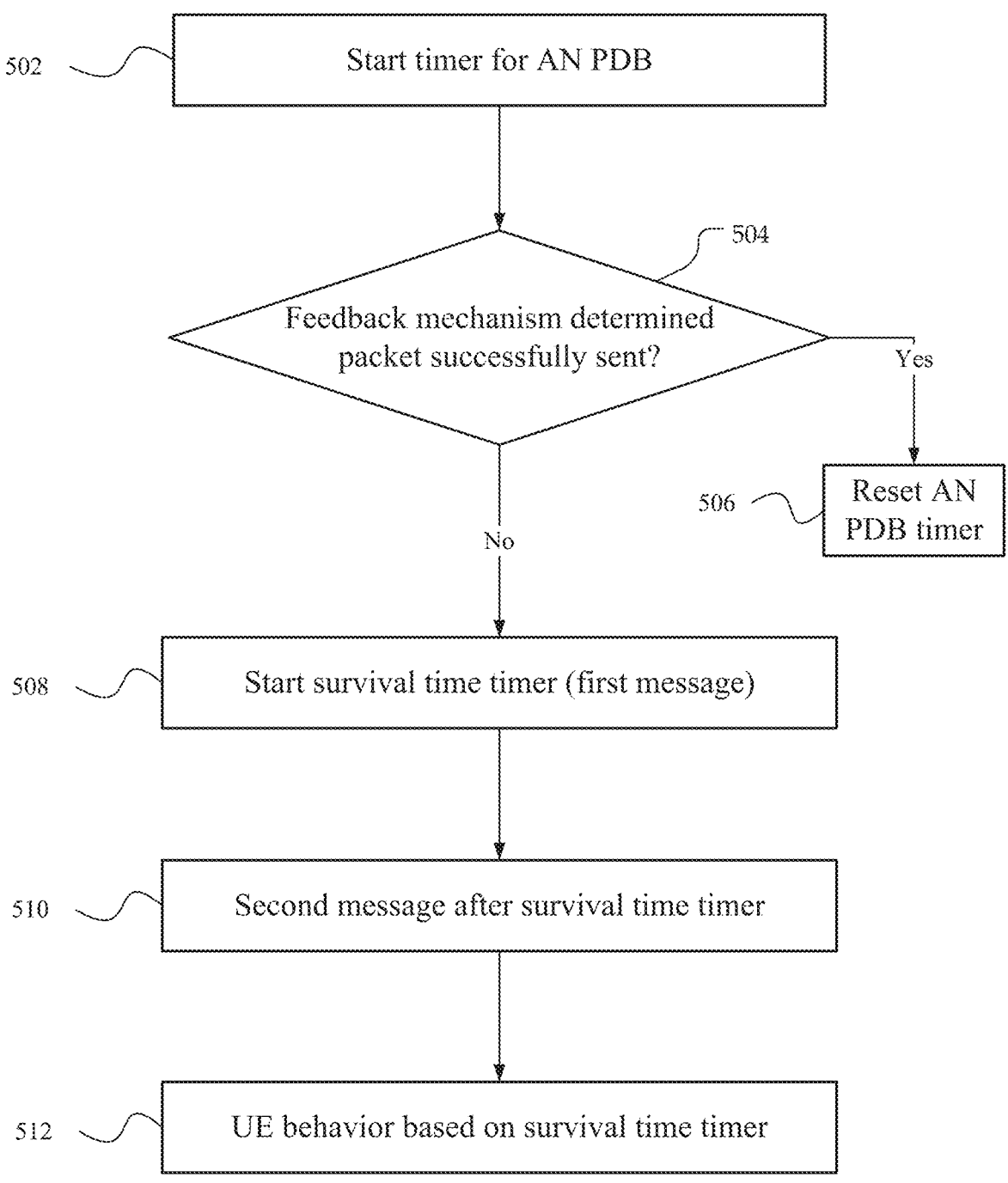
FIG. 5 shows an example process for survival time timer operation.

FIG. 5 shows an example process for survival time timer operation. This example process may be for when there is no jitter in service. In block 502, the timer for the Access Network Packet Delay Budget ("AN PDB") is started. The AN PDB is the PDB minus the CN PDB. The starting of the AN PDB timer is further described and illustrated in FIG. 6.

Figure 6:
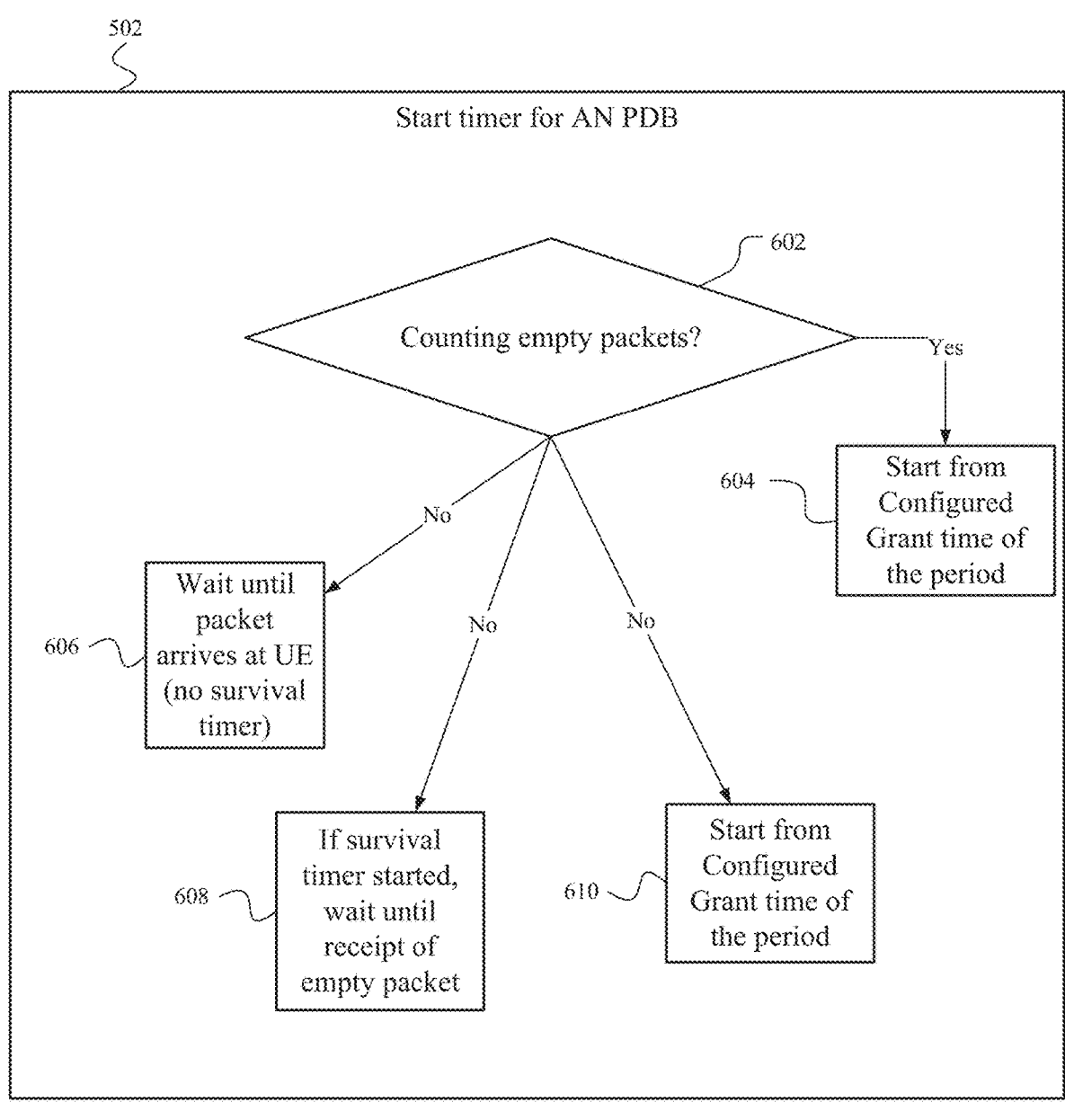
FIG. 6 shows an example process for starting an Access Network Packet Delay Budget ("AN PDB") timer.

FIG. 6 shows an example process for starting the AN PDB timer. Specifically, FIG. 6 illustrates different options or ways for starting the AN PDB timer. In block 602, a determination is made as to whether empty packets are counted. If empty packets are counted in block 602, then the AN PDB timer is started from the Configured Grant ("CG") time of the period configured according to the basestation in block 604. In another embodiment, the AN PDB timer is started based on a semi-persistent scheduling ("SPS"). Without counting or considering whether to count empty packets in block 602, the AN PDB timer may be started after the packet arrives at the UE in block 606. This may be when the survival time timer is not started. Without counting or considering whether to count empty packets in block 602, the AN PDB timer is started after confirming receipt of an empty packet when the survival time timer is started in block 608. Without counting or considering whether to count empty packets in block 602, the AN PDB timer is started from the Configured Grant time of the period configured according to the basestation in block 610.

Referring back to FIG. 5, after the timer for AN PDB is started in block 502, the feedback mechanism determines whether the packet was successfully sent in block 504. The feedback mechanism may include at least one of a dedicated DCI including ACK, no retransmission schedule received for a period of time, and a new packet schedule received within a specific period of time in some embodiments. The ACK in the dedicated DCI indicates that the packet is sent successfully, and a period of time or a specific period of time are indicated by the high layer. For example, if the sender does not receive the relevant retransmission scheduling indication within a period of time after the packet is sent, the packet is sent successfully by default. Alternatively, within a specific period of time after the packet is sent, the sender receives the scheduling indication to send the new packet, then the previous packet is sent successfully by default. A packet that was not successfully sent may include receiving a packet without service data (i.e. an empty packet) in addition to failing to receive the packet. The feedback mechanism may determine whether the packet was properly received or if it was an empty packet. If the packet was sent and received successfully, then the AN PDB timer is reset in block 506.

If the packet was not successfully sent in block 504, then the survival time timer is started in block 508. The survival time timer can be started in block 508 if it is determined by the feedback mechanism within the AN PDB timer that the packet was not sent successfully. The AN PDB timer is reset and the survival time timer is started. The survival time timer can also be started in block 508 if no packets are sent during the AN PDB timer, then the AN PDB timer is reset and the survival time timer is started. After starting the survival time timer in block 508, the second message (i.e. next cycle or next packet) may include subsequent action in block 510 that is further described and illustrated in FIG. 7.

Figure 7:
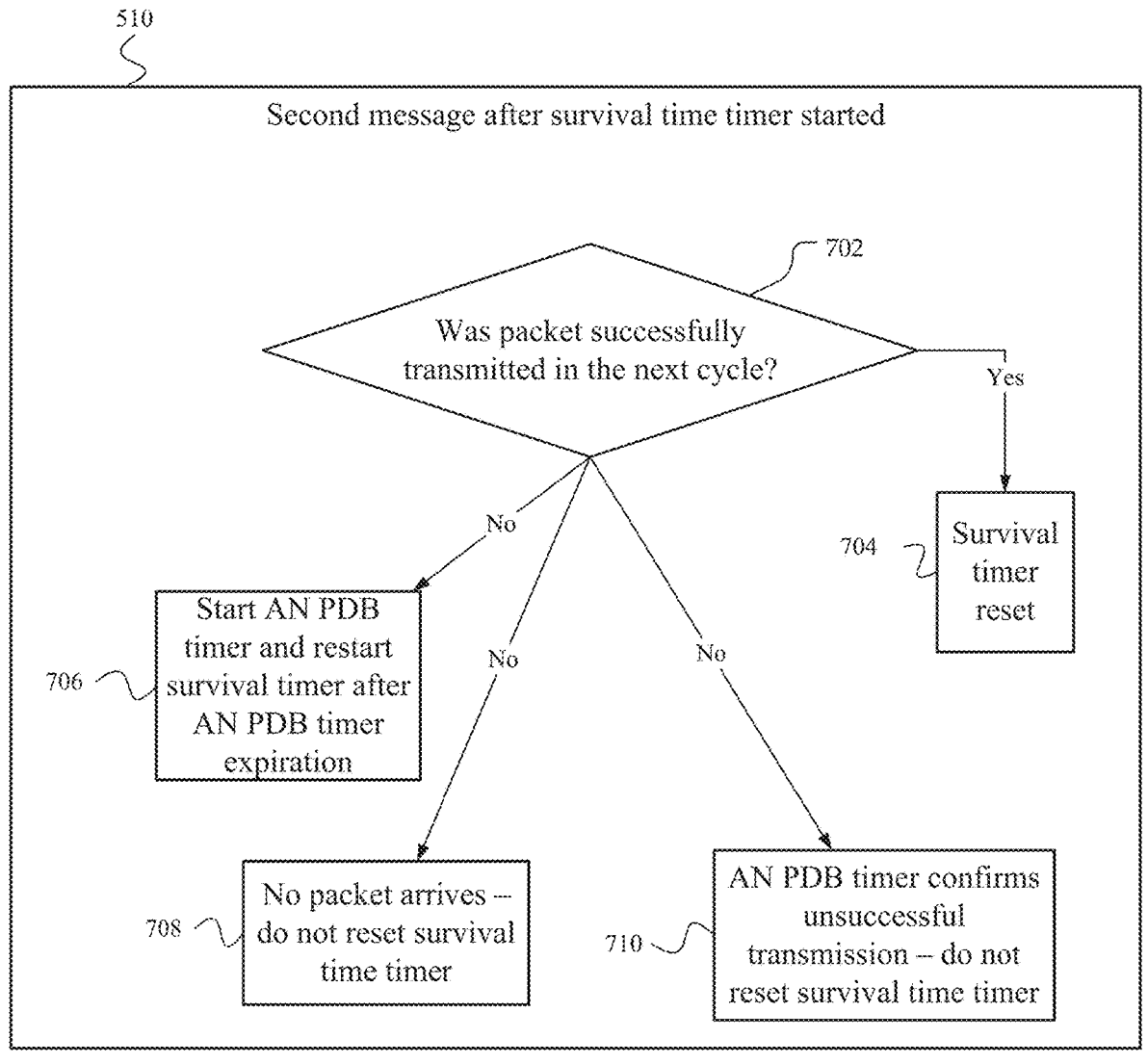
FIG. 7 shows an example process for subsequent action after starting the survival time timer.

FIG. 7 shows an example process for subsequent action after starting the survival time timer. A check is made for the next cycle (i.e. second message or next packet) to see if that packet was successfully transmitted in block 702. If the packet was successfully transmitted, then the survival time timer can be reset in block 704. If no packets arrive in the next cycle of block 702, then the AN PDB timer can be started and the survival time timer is restarted after the AN PDB timer expires in block 706. If no packets arrive in the next cycle of block 702, then the packet is sent unsuccessfully by default and the survival time timer is not reset in block 708. If no packets arrive in the next cycle of block 702, then it is determined by the AN PDB timer that the packet was not successfully transmitted in the next cycle, so the survival time timer is not reset in block 710.

Figure 8:
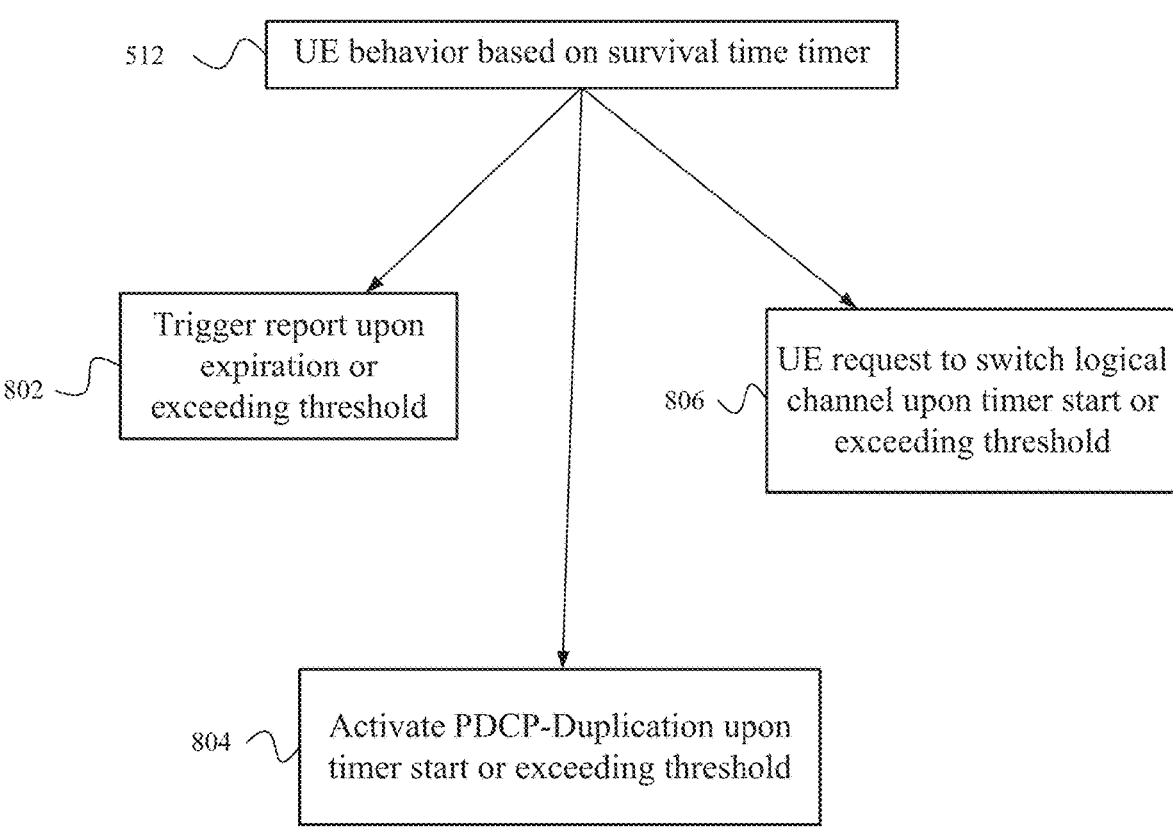
FIG. 8 shows example user equipment ("UE") behavior based on the survival time timer.

Referring back to FIG. 5, after the second message/cycle after the survival time timer start in block 510, there is additional UE behavior based on the survival time timer in block 512 that is further described and illustrated in FIG. 8.

FIG. 8 shows example user equipment ("UE") behavior based on the survival time timer in block 512. In other words, after the survival time timer starts, the behavior of the UE side may include the behavior shown in FIG. 8. Specifically, a report may be triggered when the survival time timer expires or when the survival time timer exceeds a threshold time as in block 802. In another example, the UE may independently activate a duplication function (e.g. PDCP duplication) when the survival time timer expires or when the survival time timer exceeds a threshold time as in block 804. In another example, the UE may request switching the logical channel when the survival time timer expires or when the survival time timer exceeds a threshold time as in block 806.

Figure 9:
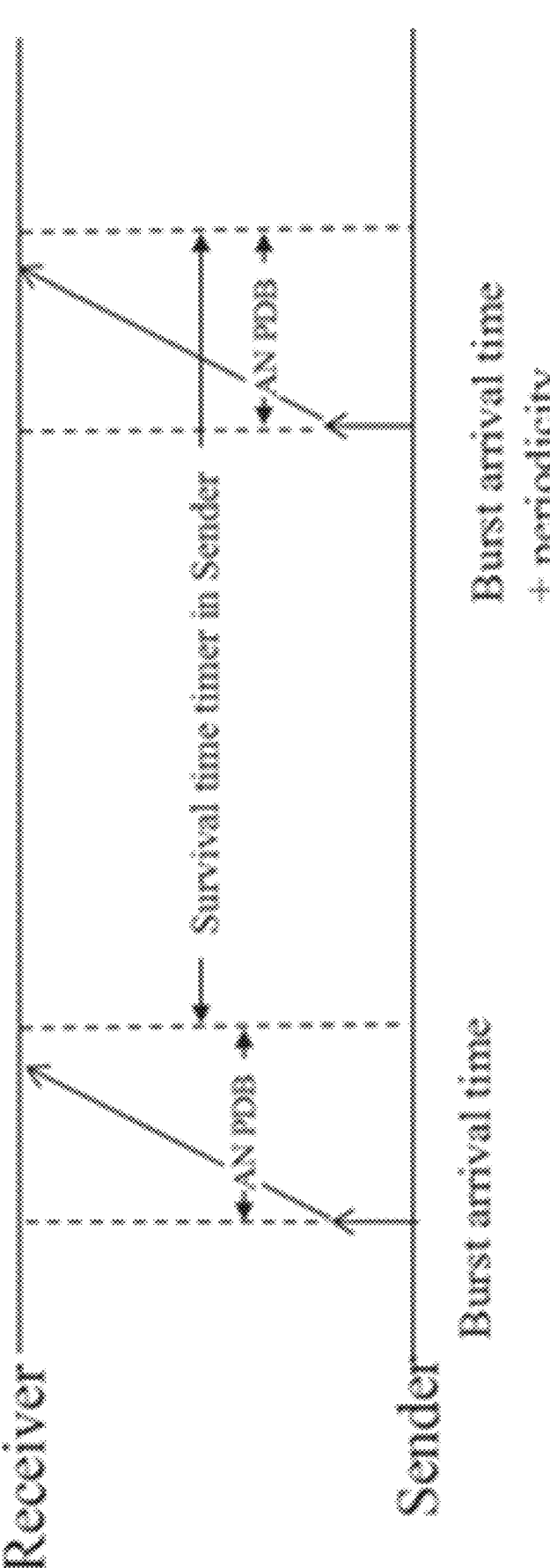
FIG. 9 shows example transmissions with no jitter.

FIG. 9 shows example transmissions with no jitter. Specifically, the process described with respect to FIGS. 5-8 is an example when there is no jitter. As shown, the sender may be an uplink service may be when the sender is UE or the sender may be a downlink service when the sender is the basestation. The transmission from sender to receiver is shown with the Access Network Packet Delay Budget ("AN PDB") and survival time. The burst arrival time is shown, which then cycles (i.e. periodicity) for the stream of packets. The successful transmission of the packet is judged by a feedback mechanism when the value of the timer is AN PDB. This is the measurement shown in FIGS. 5-8 in one example.

Figure 10:
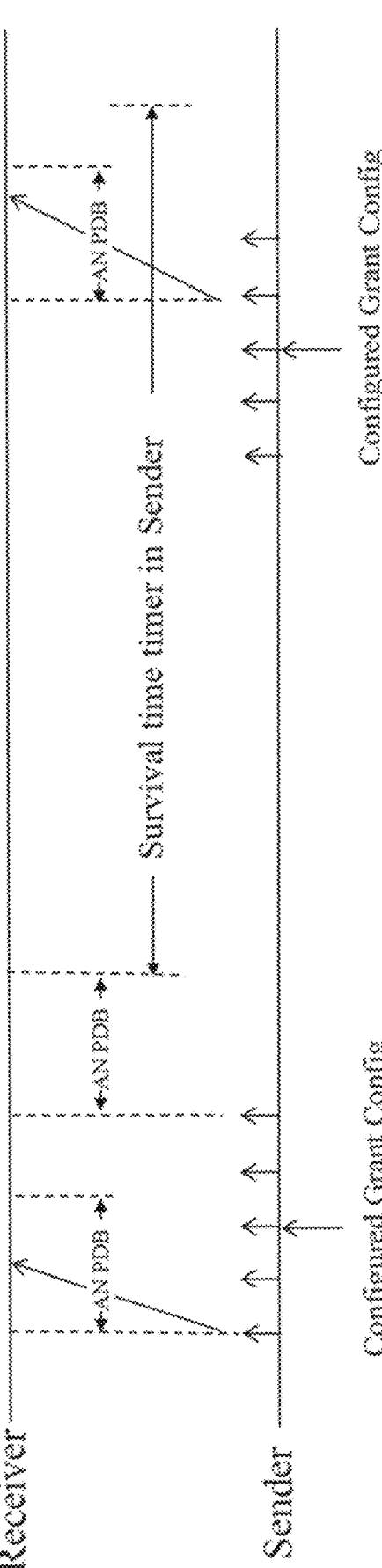
FIG. 10 shows example transmissions with jitter.

FIG. 10 shows example transmissions with jitter. Conversely, FIG. 9 illustrated an example transmission when there was no jitter in service. Jitter may include any variation in the delay of received packets. The sender may provide packets in a continuous stream with the packets spaced evenly apart, but jitter may result from network congestion, improper queuing, or configuration errors. The delay between each packet can vary instead of remaining constant. Packet delay variation ("PDV") is another type of jitter (i.e. packet jitter) and may include the difference in delay between selected packets in a flow with any lost packets being ignored. Packet jitter may be an average of the deviation from the network mean delay.

Figure 11:
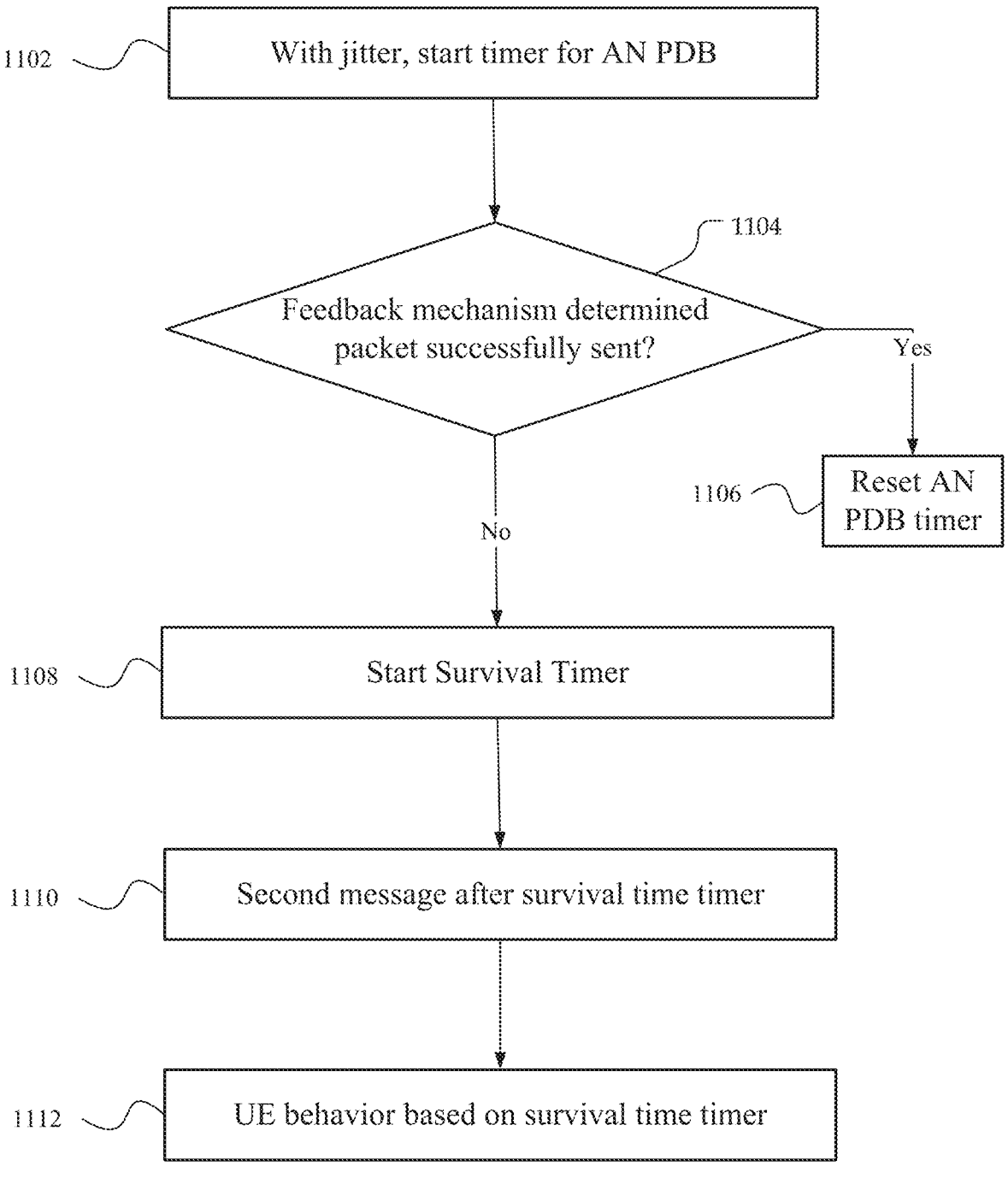
FIG. 11 shows another example process for survival time timer operation.

FIGS. 11-14 are based on FIG. 10 and illustrate an example process considering jitter. FIG. 11 shows another example process for survival time timer operation. This example process may be for when there is jitter in service. Conversely, FIG. 5 illustrated an example process when there was no jitter in service. As shown, the sender may be an uplink service may be when the sender is UE or the sender may be a downlink service when the sender is the basestation. The transmission from sender to receiver is shown with the Access Network Packet Delay Budget ("AN PDB") and survival time. The burst arrival time is shown, which then cycles (i.e. periodicity) for the stream of packets. The difference in FIG. 10 from FIG. 9 includes the Configured Grant ("CG") configurations that are shown in FIG. 10, which can account for the jitter. The successful transmission of the packet is judged by a feedback mechanism when the value of the timer is AN PDB. This is the measurement shown in FIGS. 11-14 in another example.

FIG. 11 shows another example process for survival time timer operation. This example process may be for when there is jitter in service. In block 1102, the timer for the Access Network Packet Delay Budget ("AN PDB") is started. The AN PDB is the PDB minus the CN PDB. The starting of the AN PDB timer is further described and illustrated in FIG. 12.

Figure 12:
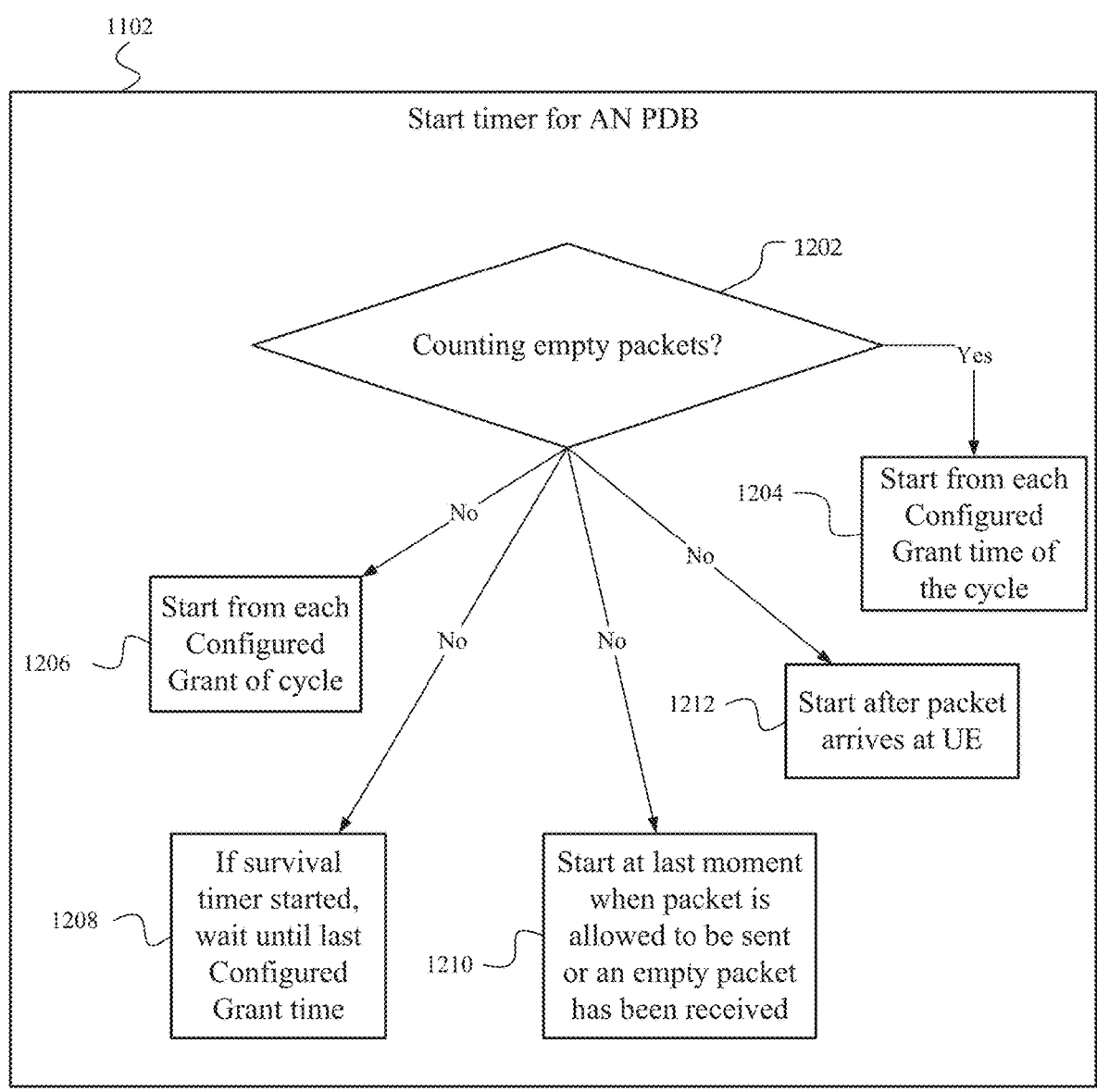
FIG. 12 shows another example process for starting an Access Network Packet Delay Budget ("AN PDB") timer.

FIG. 12 shows another example process for starting an Access Network Packet Delay Budget ("AN PDB") timer.

Specifically, FIG. 12 illustrates different options or ways for starting the AN PDB timer. In block 1202, a determination is made as to whether empty packets are counted. If empty packets are counted in block 1202, then the AN PDB timer is started from each of the Configured Grant ("CG") time of the cycle configured according to the basestation in block 1204. Without counting or considering whether to count empty packets in block 1202, the AN PDB timer may be started from each CG time of the cycle configured according to the basestation as in block 1206. This may be when the survival time timer is not started. In another embodiment, the AN PDB timer is started based on a semi-persistent scheduling ("SPS"). Without counting or considering whether to count empty packets in block 1202, the AN PDB timer is started in block 1208 at the last CG time in a cycle after confirming that an empty packet has been received in the cycle when the survival time timer has been started. Without counting or considering whether to count empty packets in block 1202, the AN PDB timer is started in block 1210 at the last moment when the packet is allowed to be sent or after confirming that an empty packet has been received or at the last moment of the cycle when the survival time timer has been started. Without counting or considering whether to count empty packets in block 1202, the AN PDB timer is started after the packet arrives at the UE in block 1212. When the survival time timer is started, if the packet is not received or when the packet is an empty packet, the survival time timer is stopped at the last CG time in a cycle, and the stopped survival time timer is continued at the last CG time on the next cycle that is not empty packet.

Referring back to FIG. 11, after the timer for AN PDB is started in block 1102, the feedback mechanism determines whether the packet was successfully sent in block 1104. A packet that was not successfully sent may include receiving a packet without service data (i.e. an empty packet) in addition to failing to receive the packet. The feedback mechanism may determine whether the packet was properly received or if it was an empty packet. If the packet was sent and received successfully, then the AN PDB timer is reset in block 1106.

If the packet was not successfully sent in block 1104, then the survival time timer is started in block 1108. The survival time timer can be started in block 1108 if it is determined by the feedback mechanism within the AN PDB timer that all packets were not sent successfully during a cycle. The AN PDB timer is reset and the survival time timer is started. The survival time timer can also be started in block 1108 if it is determined by the feedback mechanism within the AN PDB timer that all packets were not sent successfully during a cycle. The survival time timer is started after the expiration of the AN PDB timer started at the last CG time. The survival time timer can also be started in block 1108 if no packets are sent during the AN PDB timer, then the AN PDB timer is reset and the survival time timer is started after the AN PDB timer expires. The survival time timer can also be started in block 1108 if no packets are sent during the AN PDB timer, then the AN PDB timer is reset and the survival time timer is started after the expiration of the AN PDB timer started at the last CG time.

Figure 13:
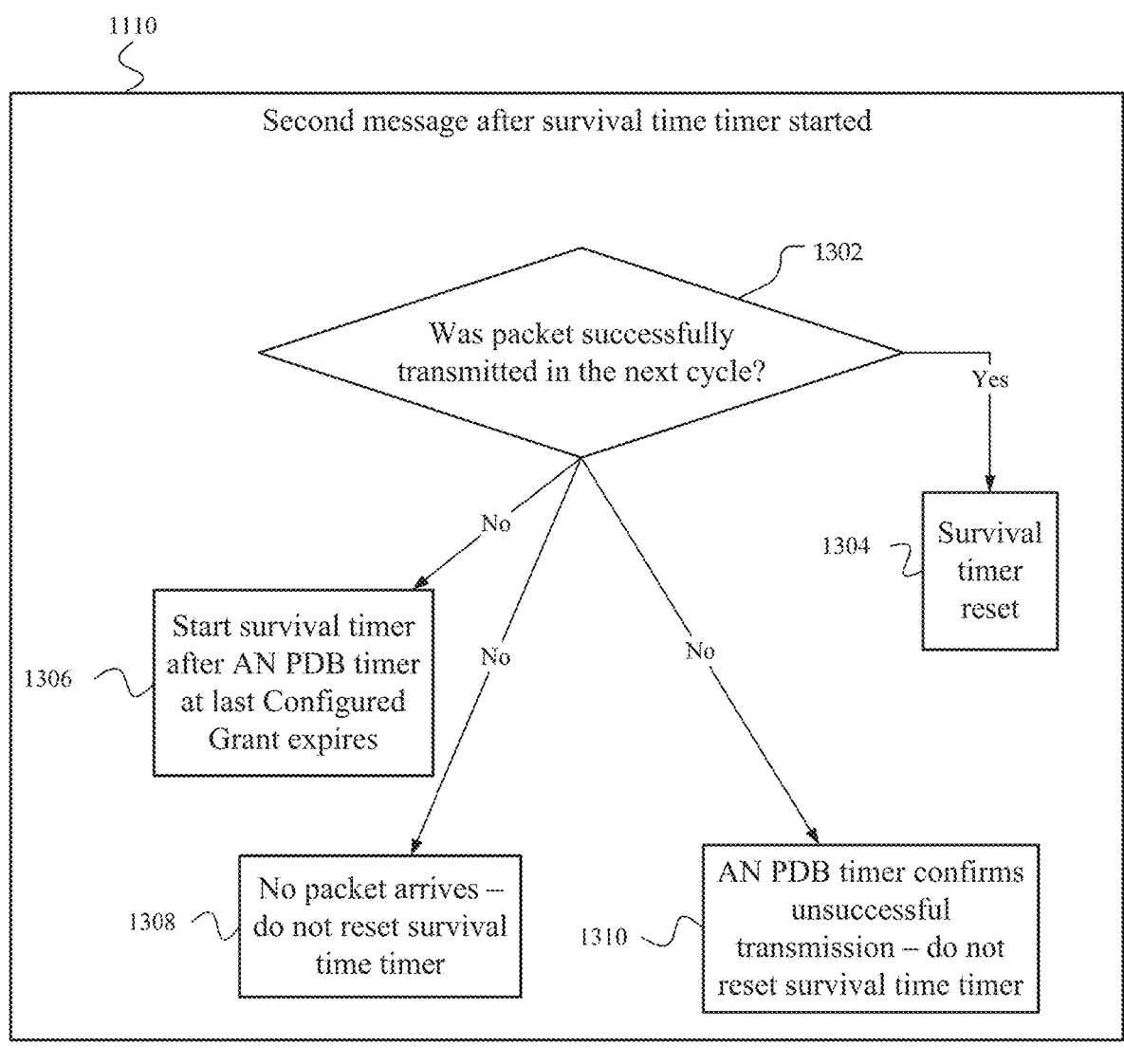
FIG. 13 shows another example process for subsequent action after starting the survival time timer.

After starting the survival time timer in block 1108, the second message (i.e. next cycle or next packet) may include subsequent action in block 1110 that is further described and illustrated in FIG. 13.

FIG. 13 shows another example process for subsequent action after starting the survival time timer. A check is made for the next cycle (i.e. second message or next packet) to see if that packet was successfully transmitted in block 1302. If the packet was successfully transmitted, then the survival time timer can be reset in block 1304. If no packets arrive in the next cycle of block 1302, then in block 1306 the survival time timer is restarted after the AN PDB timer started at the last CG time expires. If no packets arrive in the next cycle of block 1302, then the packet is sent unsuccessfully by default and the survival time timer is not reset in block 1308. If no packets arrive in the next cycle of block 1302, then it is determined by the AN PDB timer that the packet was not successfully transmitted in the next cycle, so the survival time timer is not reset in block 1310.

Figure 14:
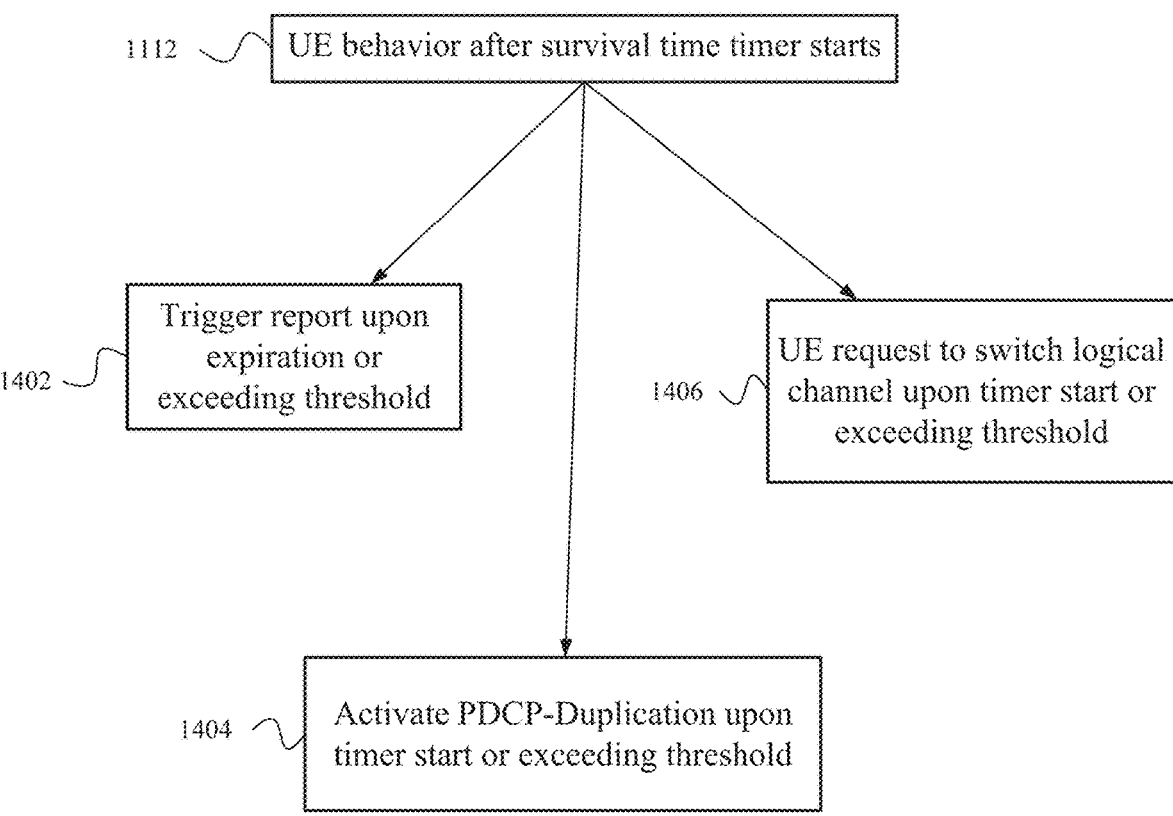
FIG. 14 shows other example user equipment ("UE") behavior based on the survival time timer.

Referring back to FIG. 11, after the second message/cycle after the survival time timer start in block 1110, there is additional UE behavior based on the survival time timer in block 1112 that is further described and illustrated in FIG. 14.

FIG. 14 shows example user equipment ("UE") behavior based on the survival time timer in block 1112. In other words, after the survival time timer starts, the behavior of the UE side may include the behavior shown in FIG. 14. Specifically, a report may be triggered when the survival time timer expires or when the survival time timer exceeds a threshold time as in block 1402. In another example, the UE may independently activate a duplication function (e.g. PDCP duplication) when the survival time timer expires or when the survival time timer exceeds a threshold time as in block 1404. In another example, the UE may request switching the logical channel when the survival time timer expires or when the survival time timer exceeds a threshold time as in block 1406.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for wireless communication comprising:
starting an access network packet delay budget ("AN PDB") timer in a cycle;
starting a survival time timer based on the AN PDB timer;
determining that a subsequent packet in a subsequent cycle was successfully transmitted; and
resetting the survival time timer when the subsequent packet was successfully transmitted in the subsequent cycle.

2. The method of claim 1, further comprising:
determining, with a feedback mechanism, whether a packet was successfully sent; and
resetting the AN PDB timer when the packet was successfully sent.

3. The method of claim 2, wherein the feedback mechanism comprises at least one an ACK in a dedicated DCI, no retransmission schedule received for a period of time, or a new packet schedule received within a specific period of time.

4. The method of claim 1, wherein the starting of the AN PDB timer is based on an arrival time of a packet or based on a configured grant ("CG") time or a semi-persistent scheduling ("SPS").

5. The method of claim 1, wherein when there are multiple AN PDB timers in a cycle, the starting of the survival time timer is based on a last AN PDB timer in a cycle.

6. The method of claim 1, wherein when the survival time timer is not started, the survival time timer is started after the AN PDB timer expires.

7. The method of claim 1, further comprising:
determining, by anticipating arrival of a packet, whether the packet arrives and whether the packet is an empty packet; and
starting the AN PDB timer when the packet does not arrive or when the packet is an empty packet.

8. The method of claim 7, wherein the starting of the survival time timer is based on the packet being an empty packet.

9. The method of claim 8, wherein after the survival time timer is started, when the packet does not arrive or when the packet is an empty packet, the survival time timer is stopped and the stopped survival time timer is continued after an empty packet cycle.

10. The method of claim 9, further comprising:
receiving a message including service related parameters from an Access and Mobility Management Function ("AMF") or a basestation, wherein the service related parameters comprise at least one of a Periodicity, a Burst Arrival Time, a survival time, a threshold for the survival time timer, or a feedback mechanism related parameter.

11. The method of claim 10, further comprising at least one of:
triggering a report when the survival time timer expires or when the survival time timer exceeds the threshold for the survival time timer;
activating a duplication function when the survival time timer expires or when the survival time timer exceeds threshold for the survival time timer; or
requesting, by a user equipment ("UE"), to switch a logical channel when the survival time timer expires or when the survival time timer exceeds threshold for the survival time timer.

12. A method for wireless communication, comprising:
starting an access network packet delay budget ("AN PDB") in a cycle;
determining, by anticipating arrival of a packet, whether the packet arrives and whether the packet is an empty packet;
starting the AN PDB timer when the packet does not arrive or when the packet is an empty packet; and
starting a survival time timer based on the AN PDB timer and the packet being an empty packet,
wherein the survival time timer is restarted after the survival time timer has been started and the AN PDB timer, which is triggered by an empty packet, expires.

* * * * *